United States Patent
Higashimoto

(10) Patent No.: US 8,041,109 B2
(45) Date of Patent: Oct. 18, 2011

(54) COLOR PROCESSOR AND COMPUTER PROGRAM PRODUCT

(75) Inventor: Hideo Higashimoto, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 985 days.

(21) Appl. No.: 11/950,554

(22) Filed: Dec. 5, 2007

(65) Prior Publication Data

US 2008/0130993 A1 Jun. 5, 2008

(30) Foreign Application Priority Data

Dec. 5, 2006 (JP) .................................. 2006-328445

(51) Int. Cl.
*G06K 9/00* (2006.01)
(52) U.S. Cl. ......... 382/167; 382/162; 382/274; 358/1.9; 358/518
(58) Field of Classification Search ................... 382/162, 382/167, 274; 358/1.9, 1.15, 518, 520, 523, 358/3.23; 345/590, 589
See application file for complete search history.

(56) References Cited

U.S. PATENT DOCUMENTS

| 5,572,632 A | * | 11/1996 | Laumeyer et al. | 358/1.17 |
| 6,327,052 B1 | * | 12/2001 | Falk | 358/1.9 |
| 7,310,165 B2 | * | 12/2007 | Stevens | 358/1.9 |
| 2007/0102623 A1 | * | 5/2007 | Fengler et al. | 250/208.1 |

FOREIGN PATENT DOCUMENTS

| JP | 2004-103017 | 4/2004 |
| JP | 2005-122722 | 5/2005 |

* cited by examiner

*Primary Examiner* — Samir Ahmed
*Assistant Examiner* — Ali Bayat
(74) *Attorney, Agent, or Firm* — Oblon, Spivak, McClelland, Maier & Neustadt, L.L.P.

(57) ABSTRACT

The present invention provides a Creating unit that creates a color conversion table to be used to convert a CIE color to a device color, a Converting unit that converts a CIE color to a device color using the CIE color conversion table created by the Creating unit, a managing unit that holds data of the CIE color conversion table in a nonvolatile storage medium, and a Controlling unit that, for color conversion from a CIE color to a device color, uses appropriate CIE color conversion tables held in the nonvolatile storage device or creates, when no appropriate CIE color conversion table is available, an appropriate CIE color conversion table and uses the created CIE color conversion table, and causes the color conversion to be performed.

15 Claims, 5 Drawing Sheets

COLOR PROCESSOR AND COMPUTER PROGRAM PRODUCT

CROSS-REFERENCE TO RELATED APPLICATIONS

The present application claims priority to and incorporates by reference the entire contents of Japanese priority document 2006-328445 filed in Japan on Dec. 5, 2006.

BACKGROUND OF THE INVENTION

1. Field of the Invention

The present invention relates to a technology for converting a Commission Internationale de l'Eclairage (CIE) color to a device color.

2. Description of the Related Art

In PostScript language, it is possible to specify colors for drawing objects (text, image, and graphic) in a document. Specifically, it is not only possible to specify a color format, such as RGB or CMYK, that is dependent on specifications of the input and output devices, but also possible to specify a color format called CIE that is independent of the specification of the input and output devices and uses a color system based on human's perception of colors. When colors are specified in the CIE format, a unit called an interpreter internally converts the specified CIE colors into CMYK color values that are supported by the printer engine and are device dependent. The conversion is controlled by two dictionaries: a first dictionary (color space dictionary (CSD)) that defines conversion of an input CIE color space to XYZ stimulus values (intermediate values) of the CIE 1931 XYZ color space, and a second dictionary (color rendering dictionary (CRD)) that defines conversion from XYZ stimulus values (intermediate values) to CMYK color values specific to an output device. How such a conversion can be performed has been described in detail in "PostScript Language Reference, 3rd edition" from Adobe System Incorporated. Because the conversion processing is complicated and requires a large amount of calculations, it takes more time for color conversion than the processing using colors specified in RGB or CMYK, causing a significant degradation in the printing performance.

To suppress the degradation in the printing performance, conversion calculations are performed beforehand with some color samples of CIE colors thereby calculating CMYK color values of those sample colors. Then, a conversion table is prepared that includes the sample color values, i.e., CIE color values, and their equivalent CMYK color values, and color conversion is performed by using the conversion table. To convert CIE colors that are not in the conversion table, a method of interpolation (e.g., tetrahedral interpolation or triangular prism interpolation) is employed. Although the process of creating the conversion table is time consuming, once the conversion table is created, an approximate conversion of almost any color can be performed in a shorter time.

A typical interpreter assigns/applies a single CRD to a single document or page, so that it is sufficient to create the conversion table only once. Further, the interpreter includes a function for improving the finish of the entire document for which colors are specified in CIE, i.e., a color expansion function of a PostScript (PS) interpreter that assigns/applies a CRD that reproduces optimal rendering intents for each type of drawing objects (text, image, and graphic), thereby improving the finish of the entire document for which colors are specified by CIE. This function is also called as a CRD automatic switching function.

Japanese Patent Laid Open No. 2004-103017 discloses a related technology. This publication discloses to embed a render table for graphics and a render table for images by coupled to each other in a one CRD. Further, means is provided that dynamically determines whether a calculation for color conversion using the CRD is to be performed on graphics or images, and allows access to one of the render tables based on the result of the determination. When such a configuration is employed, it becomes possible to perform the color conversion appropriately for each of two different drawing objects by using one CRD.

The expansion function requires the recreation of the CIE color conversion table every time the type of the drawing object switches. Thus, if the number of drawings of PS data to be processed is large, then there is an increase in the number of processing times and the execution time for the creation of CIE color conversion table, causing a significant degradation in performance.

The technology described in Japanese Patent Laid-Open No. 2004-103017 supports only two types of drawing objects: graphic and image. In other words, it does not support text. Further, color conversion is performed for any one of those drawing objects only by switching between the render tables, each serving as an element in the CRD. Thus, there is a limitation on the level for appropriate color conversion.

The technology described in Japanese Patent Laid-Open No. 2004-103017 is not suitable if the drawing object is of other type, such as text, or when other elements (e.g., Matrix-PQR or TransformPQR relating to CIE gamut mapping) of the CRD need to be used to improve the level for appropriate color conversion. In other words, it is necessary to implement a method including defining (preparing) a CRD corresponding to each drawing object, switching a CRD corresponding to each drawing object, and then performing CIE color conversion. Thus, this technology fails to solve the problem of degradation in performance.

SUMMARY OF THE INVENTION

It is an object of the present invention to at least partially solve the problems in the conventional technology.

According to an aspect of the present invention, there is provided a color processing apparatus including a creating unit that creates at least one CIE color conversion table to be used to convert a CIE color to a device color; a storing unit that stores therein the CIE color conversion table created by the creating unit; a controlling unit that, when a CIE color is specified, checks if a CIE color conversion table that is appropriate for specified CIE color is present in the storage unit, and if a CIE color conversion table that is appropriate for the specified CIE color is present in the storage unit, selects that CIE color conversion table as a target CIE color conversion table, and if a CIE color conversion table that is appropriate for the specified CIE color is not present in the storage unit, causes the creating unit to create a CIE color conversion table that is appropriate for the specified CIE color as a target CIE color conversion table; and a converting unit that converts the specified CIE color to a device color by using the target CIE color conversion table.

According to another aspect of the present invention, there is provided a color processing apparatus including creating unit that creates at least one CIE color conversion table to be used to convert a CIE color to a device color; a storing unit that stores therein the CIE color conversion table created by the creating unit; a controlling unit that, when a CIE color is specified, decides an appropriate CIE color conversion table for specified CIE color, checks if the appropriate CIE color conversion table is present in the storage unit, and if the appropriate CIE color conversion table is present in the storage unit, selects that CIE color conversion table as a target CIE color conversion table, and if the appropriate CIE color conversion table is not present in the storage unit, causes the creating unit to create a CIE color conversion table that is appropriate for the specified CIE color as a target CIE color conversion table, and stores the target CIE color conversion table in the storage unit; and a converting unit that converts the specified CIE color to a device color by using the target CIE color conversion table.

According to still another aspect of the present invention, there is provided a computer program product that includes a computer-readable recording medium and a computer program stored on the computer-readable recording medium. The computer program when executed on a computer causes the computer to execute creating at least one CIE color conversion table to be used to convert a CIE color to a device color and storing the CIE color conversion table in a storing unit; deciding, when a CIE color is specified, an appropriate CIE color conversion table for specified CIE color; checking if the appropriate CIE color conversion table is present in the storage unit; selecting, if the appropriate CIE color conversion table is present in the storage unit, that CIE color conversion table as a target CIE color conversion table; creating, if the appropriate CIE color conversion table is not present in the storage unit, a CIE color conversion table that is appropriate for the specified CIE color as a target CIE color conversion table, and storing the target CIE color conversion table in the storage unit; and converting the specified CIE color to a device color by using the target CIE color conversion table.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below while referring to the accompanying drawings.

Figure 1:
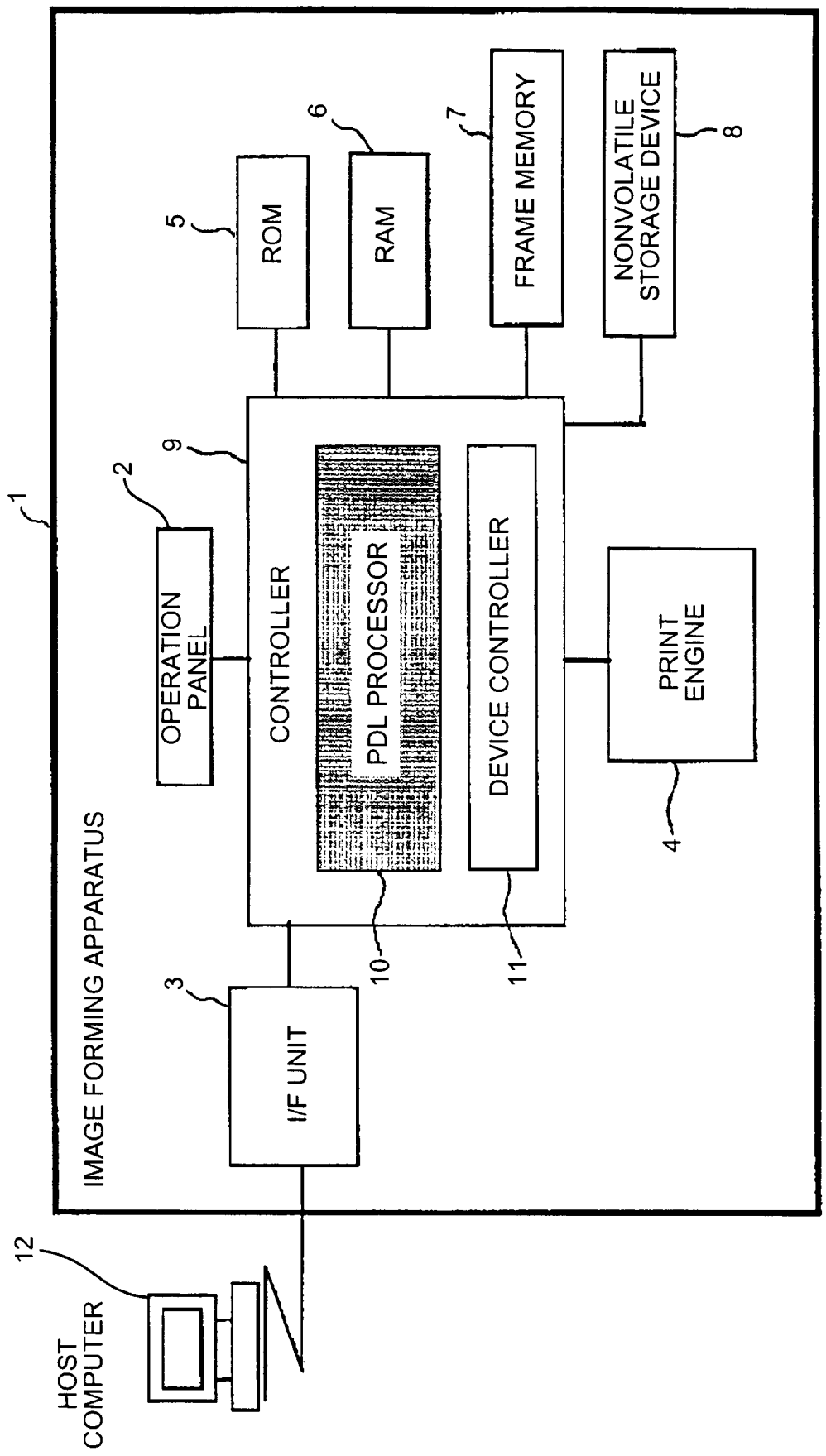
FIG. 1 is a schematic of an overall control configuration of an image forming apparatus according to a first embodiment of the present invention.

FIG. 1 is a schematic of an overall control configuration of an image forming apparatus according to a first embodiment of the present invention. The image forming apparatus 1 includes an operation panel 2, a I/F unit 3, a print engine 4, a read only memory (ROM) 5, a random access memory (RAM) 6, a frame memory 7, a nonvolatile storage device 8, and a controller 9. The controller 9 includes a page description language (PDL) processor 10 and a device controller 11. The image forming apparatus 1 is communicably connected to a host computer 12 via the I/F unit 3.

Figure 2:
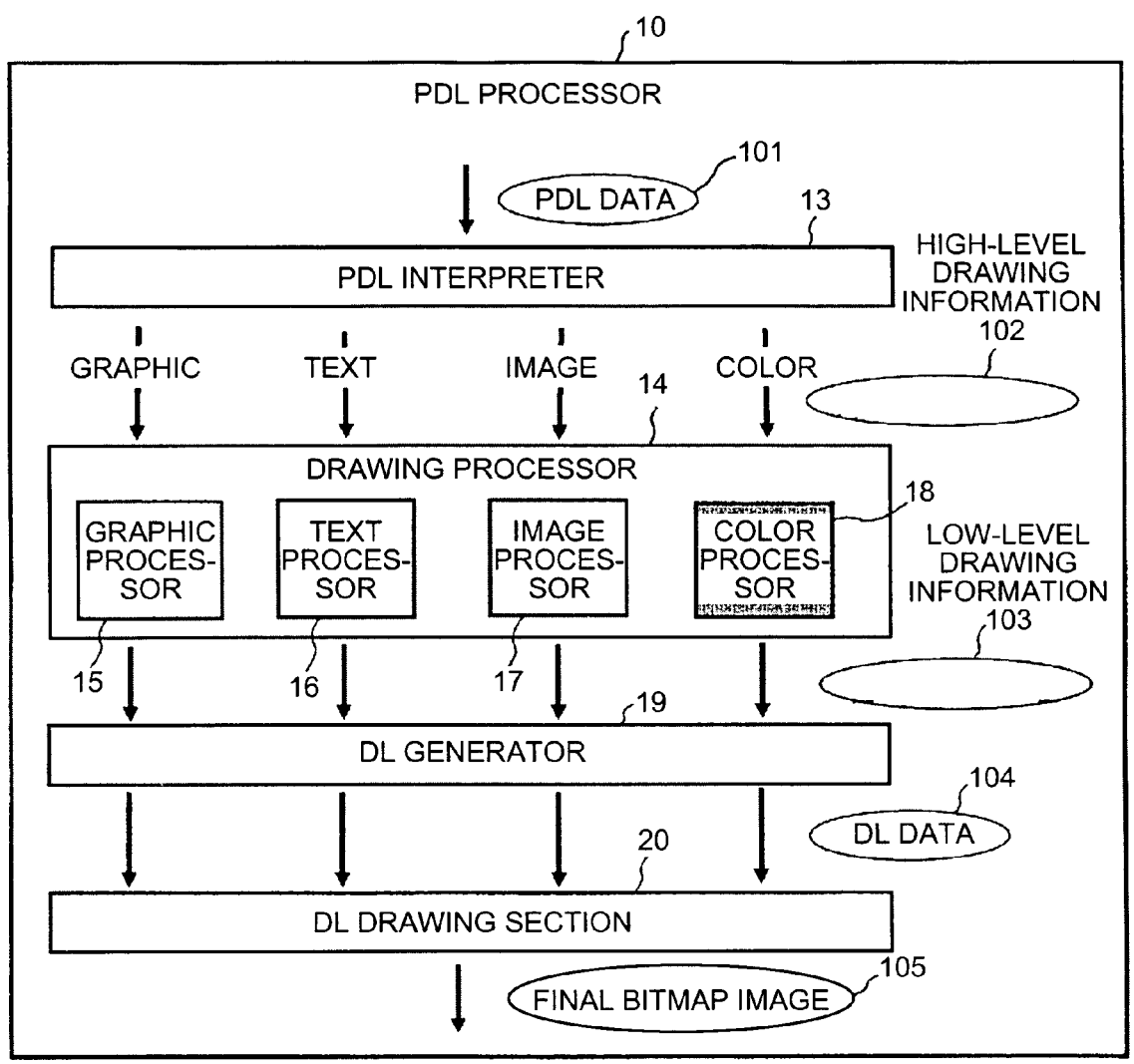
FIG. 2 is a block diagram of a PDL processor shown in FIG. 1.

The PDL processor 10 is a module that operates on the controller 9. The PDL processor 10 receives PDL data from the host computer 12 via the I/F unit 3, interprets the received PDL data, creates a bitmap image of a page image by performing drawing processing following the description acquired in the interpretation of the PDL data, and write the bitmap image onto the frame memory 7 via the device controller 11. The internal configuration of the PDL processor 10 is shown in FIG. 2. Although the frame memory 7 is shown as a separate component in FIG. 1, it can be realized on the universal RAM 6 or on some other not shown storage means in the image forming apparatus.

The print engine 4 in an image creating unit and it is controlled by the controller 9. The print engine 4 performs image formation on a recording medium (such as a paper) fed from a medium feeding device (not shown). The image formation can be, but not limited to, electrophotographic or ink-jet image formation.

FIG. 2 is a functional block diagram of the PDL processor 10. The PDL processor includes a PDL interpreter 13, a drawing processor 14, a display list (DL) generator 19, and a DL drawing section 20. The PDL interpreter 13 interprets and analyzes codes (PDL data 101) written in PDL such as PostScript or a printer command language (PCL) to extract high-level drawing information 102 about drawing elements such as graphic, text, image, and color from the codes.

The drawing processor 14 performs drawing processing on the high-level drawing information 102, then converts the drawing information to low-level drawing information 103. Generally, the conversion processing is complicated, and the time required for the processing accounts for a large portion of the entire processing time required by the PDL processor 10. The drawing processor 14 includes a graphic processor 15, a text processor 16, an image processor 17, and a color processor 18, each of which performs conversion processings for corresponding drawing elements.

The DL generator 19 converts the low-level drawing information 103 to drawing data (DL data 104) in a format for intermediate storage data called DL, and stores the DL data 104 in the RAM 6. When storing the DL data in the RAM 6, the DL generator 19 can store DL data for one page, or DL data for a plural pages at a time. Because the DL data is (low-level) information, which can be easily expanded to a final bitmap image to be written to the frame memory 7, the amount of the data is much larger than that of the high-level information, often requiring a memory capacity in units of megabytes for storing DL data in the RAM 6 for one or more pages.

The DL drawing section 20 reads out DL data 104 stored in the RAM 6, performs processing on the DL data 104 such as pattern processing, gradation conversion (processing for converting pixel values of high gray level to pixel values of low gray level by a dither or error diffusion method), mask (CLIP), Raser OPeration (ROP) (logic operation for overlaying pixel values of Source, Destination, and Pattern) to create a final bitmap image 105, and writes the final bitmap image 105 to the frame memory 7. It is possible to reduce the necessary memory capacity if the DL drawing section 20 is configured so as to perform such processing on areas called strip bands, created by separating a frame memory for one page in parallel along a main scan directionmemory capacity.

Figure 3:
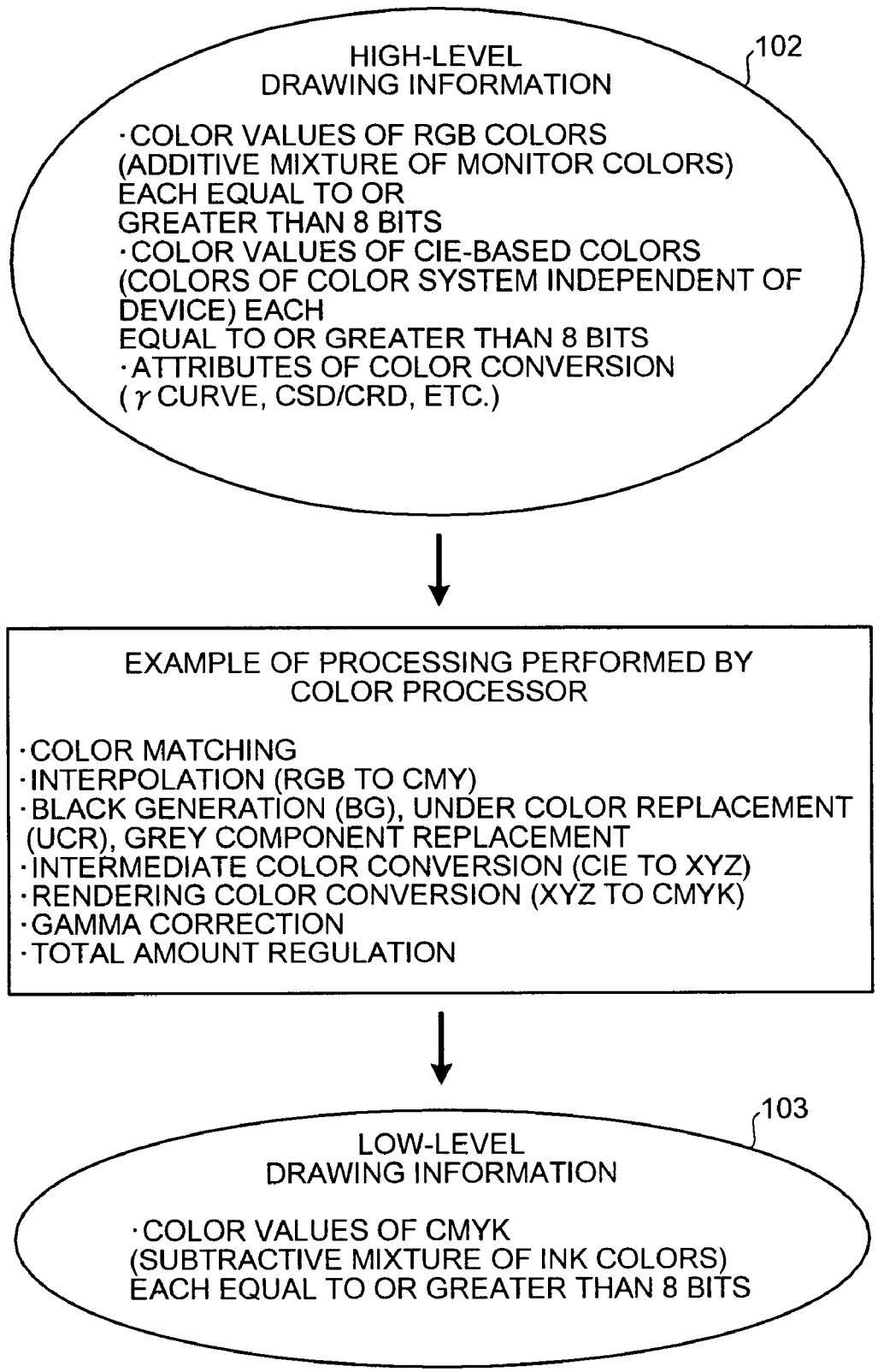
FIG. 3 is a schematic for explaining an example of the processings performed by a color processor shown in FIG. 2.

FIG. 3 is a schematic for explaining the processings performed by the color processor 18. The color processor 18 converts the high-level drawing information 102 to low-level drawing information 103. The high-level drawing information 102 can include red, green, and blue (RGB) color values (additive mixture of monitor colors) each being equal to or greater than 8 bits, CIE color values (colors of device-independent color system) each being equal to or greater than 8 bits, or attributes of color conversion (γ curve, CSD/CRD). The low-level drawing information 103 includes CMYK color values (subtractive mixture of ink colors) each being equal to or greater than 8 bits. Specifically, the color processor 18 performs processings such as:

(1) color matching;
(2) interpolation conversion (from RGB to CMY);
(3) black generation (BG), under color removal (UCR), and grey component replacement;
(4) intermediate color conversion from CIE to XYZ;
(5) rendering color conversion from XYZ to CMYK;
(6) gamma correction; and
(7) total amount regulation.

Figure 4:
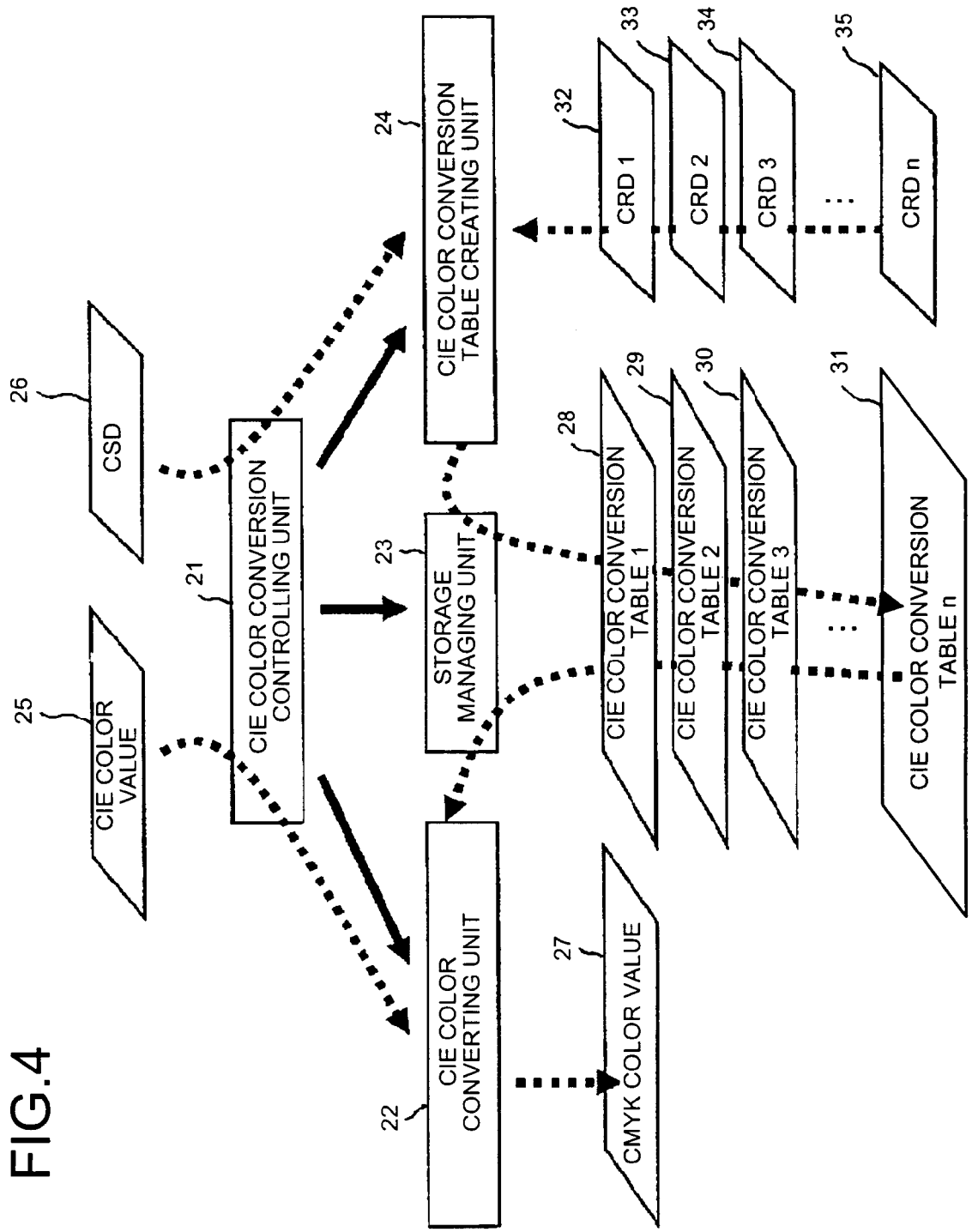
FIG. 4 is a functional block diagram of the color processor shown in FIG. 2.

FIG. 4 is a functional block diagram of the color processor 18. The color processor 18 includes a CIE color conversion controlling unit 21, a CIE color converting unit 22, a storage managing unit 23, and a CIE color conversion table creating unit 24. Rectangles represent functional configuration while and rhombuses indicate data. FIG. 4 explains how the color processor 18 converts an input CIE color value 25 to a CMYK color value 27. Specifically, when converting the input CIE color value 25 to the CMYK color value 27, approximate calculation is performed by interpolation.

With some input sample values, corresponding CMYK color values need to be calculated beforehand according to the CIE color conversion specification so as to create a mapping table including pairs of input and output values. When a CIE color value other than the sample values needs to be converted, interpolation (e.g., tetrahedral interpolation or triangular prism interpolation) is performed using some sample values and corresponding output values of the mapping table, so as to approximately calculate an output value based on the input value.

In the present embodiment, the mapping table is referred to as a CIE color conversion table, and includes conversion tables 1 to n (n is an integral number equal to or greater than 2). In FIG. 4, the CIE color conversion tables 1, 2, 3, . . . , n are denoted by reference numerals 28, 29, 30, and 31. The CIE color conversion tables 28 to 31 are created by the CIE color conversion table creating unit 24. During creation of these tables, CIE color conversion is controlled based on the following two kinds of information: information (26) called a color space dictionary (CSD) that defines conversion from an input CIE color space to XYZ stimulus values (intermediate values); and information elements (32 to 35) called color rendering dictionaries (CRDs) that define conversion from XYZ stimulus values (intermediate values) to a CMYK color value specific to an output device. Details of these two kinds of information and conversion specification defined thereby are described in "PostScript Language Reference, 3rd edition" from Adobe System Incorporated which is incorporated herein by reference.

Figure 5:
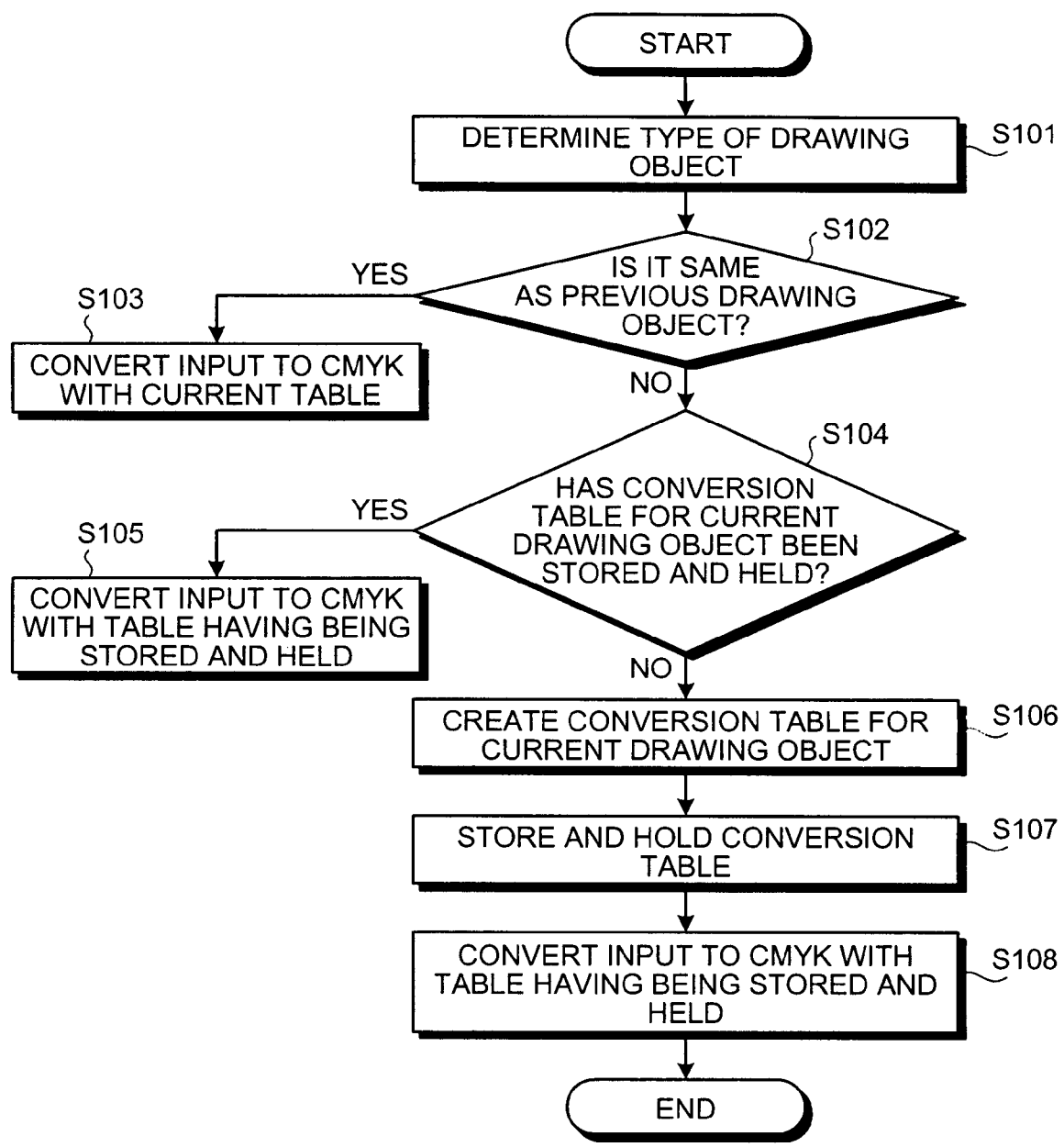
FIG. 5 is a flowchart of a color conversion process performed by the CIE color conversion controlling unit shown in FIG. 4.

The CIE color conversion controlling unit 21 controls the overall color conversion process. FIG. 5 is a flowchart of the color conversion process.

The CIE color conversion controlling unit 21 determines which CIE color conversion table (type of the CIE color conversion table) is appropriate to convert the input CIE color value 25 to the CMYK color value 27 by interpolation (Step S101). For example, with the function of converting a CIE color using a CRD prepared for each type of drawing objects (text, graphic, and image), the CIE color conversion controlling unit 21 determines that a CIE color conversion table for graphic object is necessary for color conversion currently being performed to draw a graphic object.

The CIE color conversion controlling unit 21 then checks whether the CIE color conversion table, currently used by the CIE color converting unit 22, is a CIE color conversion table for graphic objects (Step S102). If it matches (YES at Step S102), the CIE color conversion controlling unit 21 causes the CIE color converting unit 22 to convert the input CIE color value 25 to the CMYK color value 27 by interpolation (Step S103).

If there is no match (NO at Step S102), the CIE color conversion controlling unit 21 causes the storage managing unit 23 to check whether any CIE color conversion table for graphic object has been stored and held (Step S104). If it has been stored and held (YES at Step S104), the CIE color conversion controlling unit 21 sets the CIE color converting unit 22 to use the CIE color conversion table for graphic object having being held (either of 28 to 31), and then causes it to convert the input CIE color value 25 to the CMYK color value 27 by interpolation (Step S105).

If it has not been stored and held (NO at Step S104), the CIE color conversion controlling unit 21 causes the CIE color conversion table creating unit 24 to create a CIE color conversion table using a CSD (24) and a CRD for graphic object (either of 32 to 35) (Step S106), and then causes the storage managing unit 23 to store and hold the table in the nonvolatile storage device 8 (Step S107). As the nonvolatile storage device 8, a hard disk drive serving as a high capacity storage unit is used, for example.

Further, the CIE color conversion controlling unit 21 sets the CIE color converting unit 22 to use the CIE color conversion table for graphic object thus stored (either of 28 to 31), and then causes it to convert the input CIE color value 25 to the CMYK color value 27 by interpolation (Step S108).

The approximation accuracy of interpolation performed by the CIE color converting unit 22 can be improved by increasing the number of samples of the CIE color conversion tables. More samples, however, inevitably require more memory capacity. One approach to reduce the memory capacity is to compress data before storing it.

Another approach to reduce the memory capacity is to put a limitation on the number of CIE color conversion tables stored and held concurrently. When storing a new table, an existing oldest table or a least-accessed table can be deleted.

As such, the present embodiment improves color processing performance (print performance) for a document in which CIE colors are specified. Further, color processing performance can also be improved for a document in which RGB/CMYK device colors are redirected to CIE colors with a function of UseCIPColor device parameter using PostScript.

As is understood from the explanation of the first embodiment, the present invention has such a feature that a plurality of CIE color conversion tables, created by switching CRDs corresponding to respective drawing objects, are cached in a memory for reuse. This configuration improves color processing performance for a document in which CIE colors are specified.

Specifically, for the CIE color conversion necessary to draw a drawing object (e.g., text), when a CIE color conversion table is created using a CRD corresponding to the drawing object, the conversion table is stored in a memory (RAM 6). Then, when the drawing object is switched to a drawing object of another type (e.g., image), the CIE conversion table for the previous drawing object is held without being discarded. Further, when the drawing object is switched to the previous drawing object (text) again, the CIE color conversion table for the drawing object is not recreated, and the one stored and held in the memory (RAM 6) is used to perform color conversion. This arrangement reduces processing time required to recreate the CIE color conversion table. Accordingly, the color processing performance (print performance) is improved by suppressing the number of times the CIE color conversion table is created, even when the number of drawing objects is large for a document in which CIE colors are specified and the switching of drawing objects is performed more frequently.

A second embodiment of the present invention relates to reducing the necessary storage capacity by using less number of samples. The second embodiment allows reduction in memory capacity required for this processing and cost cut of memory components, thereby enabling to support low-end printers offering highly competitive prices.

The overall control configuration of an image forming apparatus according to the second embodiment is same or almost the same as that shown in FIG. 1, the configuration of a PDL processor according to the second embodiment is same or almost the same as that shown in FIG. 2, the configuration of a color processor according to the second embodiment is same or almost the same as that shown in FIG. 4.

The CIE color conversion table creating unit 24 according to the second embodiment has such a feature that the CIE color conversion tables 28 to 31 created by the CIE color conversion table creating unit 24 can be created using the number of samples of a variable value (not a fixed value) specified by the CIE color conversion controlling unit 21. The CIE color conversion controlling unit 21 allows the user to select from among a plurality of options by making an input via the operation panel 2 or the I/F unit 3, so as to select the number of samples defining a tradeoff between color reproducibility and required memory capacity. This arrangement allows the user to adjust the number of samples according to his or her priority such as image quality or avoidance of errors due to insufficient memory.

In addition to the method for allowing the user to directly specify the number of samples with a numeric value such as 500 or 1024, a method can also be used to set the number of samples in which a plurality of exclusively selectable modes such as "image quality priority mode", "normal mode", "memory error avoidance priority mode" are provided as parameters for menu items or specified commands on the operation panel 2, for example, and in which the number of samples such as 1000, 500, and 300 are internally set when the selection is made to "image quality priority mode", "normal mode", and "memory error avoidance priority mode", respectively. Specifically, according to an input made via the operation panel 2 either for the number of samples or the specified mode, the CIE color conversion controlling unit 21 causes the CIE color conversion table creating unit 24 to create data for a CIE color conversion table(s) corresponding to the specified number of samples. Similarly, the CIE color conversion controlling unit 21 can detect a specified number of samples according to data input via the host I/F or a specified setting mode associated with a certain number of samples, so as to cause the CIE color conversion table creating unit to create data for a CIE color conversion table(s) corresponding to the specified number of samples.

Alternatively, the CIE color conversion controlling unit 21 can be configured so as to detect a memory capacity of the embedded RAM 6 or a free memory capacity for processing-use in the RAM 6, and use more number of samples as the memory capacity is sufficient thereby enhancing the color reproducibility. Thus, weight is given to avoidance of error due to insufficient memory when the memory capacity is small, and weight is given to the image quality when the memory capacity is sufficiently large.

The CIE color conversion controlling unit 21 can be configured to change the tradeoff between the color reproducibility and the required memory capacity depending on the type of the drawing object, by referring to the number of samples assigned to each type of the drawing objects (text, graphic, and image) dealt with by the CIE color conversion tables 28 to 31. For example, color reproducibility can be sacrificed for a text drawing that has less color variation; because, errors arising from sacrificing of the color reproducibility are unnoticeable to human eyes. Thus, the number of samples can be reduced compared with those in graphic or image drawing object, enabling to reduce the memory capacity by the amount of the reduced numbers.

Parts not specifically explained are configured and function as those in the first embodiment, and overlapping description is omitted.

The second embodiment includes an arrangement in which a plurality of CIE color conversion tables created by switching CRDs according to drawing objects are cached in the memory for reuse, further reducing the memory capacity. This arrangement allows improvement in color processing performance for a document in which CIE colors are specified, realizing a cost reduction.

Specifically, for CIE color conversion necessary to draw a drawing object (e.g., text) as described, when the CIE color conversion table is created using the CRD corresponding to the drawing object, the conversion table is stored in the memory (RAM 6). Then, even when the drawing object is switched to a drawing object of another type (e.g., image), the CIE conversion table for the previous drawing object is held without being discarded. When the drawing object is switched to the previous drawing object (text) again, the CIE color conversion table for the drawing object is not recreated, and the one having been stored and held in the memory (RAM 6) is used to perform color conversion. This arrangement reduces processing time required to recreate the CIE color conversion table.

To apply the arrangement to low-end printers offering highly competitive prices as described, it is necessary to reduce the work memory capacity required for processing. Accordingly, in the second embodiment, the number of samples used to create a CIE color conversion table(s) can be controlled. Further, according to user specification or embedded memory capacity (tradeoff with color reproducibility), a table(s) are created with less number of samples. This arrangement reduces the data size of the tables, allowing reduction in memory capacity required for caching.

According to some aspects of the present invention, the color processing performance (print performance) is improved for a document in which CIE colors are specified. Furthermore, the color processing performance (print performance) can also be improved for a document in which RGB/CMYK device colors are redirected to CIE colors with a function of UseCIEColor device parameter written in PostScript.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color processing apparatus comprising:
a creating unit that creates at least one CIE color conversion table to be used to convert a CIE color to a device color value;
a storing unit that stores therein the CIE color conversion table created by the creating unit;
a controlling unit that, when a CIE color is specified, decides an appropriate CIE color conversion table for specified CIE color, checks if the appropriate CIE color conversion table is present in the storage unit, and
if the appropriate CIE color conversion table is present in the storage unit, selects that CIE color conversion table as a target CIE color conversion table, and
if the appropriate CIE color conversion table is not present in the storage unit, causes the creating unit to create a CIE color conversion table that is appropriate for the specified CIE color as a target CIE color conversion table, and stores the target CIE color conversion table in the storage unit; and
a converting unit that converts the specified CIE color to a device color value by using the target CIE color conversion table,
wherein the controlling unit detects an embedded memory capacity, calculates an appropriate number of samples for the memory capacity, and causes the creating unit to create the target CIE color conversion table corresponding to the number of samples.

2. The color processing apparatus according to claim 1, wherein when a current drawing object is changed from a first drawing object of a second drawing object, the controlling unit checks whether a CIE color conversion table appropriate for the second drawing object is present in the storage unit, and
if a CIE color conversion table appropriate for the second drawing object is present in the storage unit, selects that CIE color conversion table as the target CIE color conversion table, and
if a CIE color conversion table appropriate for the second drawing object is not present in the storage unit, causes the creating unit to create a CIE color conversion table appropriate for the second drawing object as the target CIE color conversion table, and stores the target CIE color conversion table in the storage medium.

3. The color processing apparatus according to claim 1, wherein the creating unit performs, using a color space dictionary (CSD) currently set and a color rendering dictionary (CRD) prepared for a type of the drawing object, calculation of conversion prespecified in PostScript language specifications with some color sample values as an input CIE color, calculates a corresponding output device color value, and creates a conversion table including a pair of an input CIE color value and a corresponding output device color value.

4. The color processing apparatus according to claim 1, wherein the creating unit creates the CIE color conversion table corresponding to number of samples that is specified by the controlling unit, the number of samples including a variable value for creation of a conversion table including a pair of an input CIE color value and a corresponding output device color value.

5. The color processing apparatus according to claim 1, wherein the controlling unit detects a specified number of samples input via an operation panel or a specified setting mode associated with a certain number of samples, and causes the creating unit to create the target CIE color conversion table corresponding to the specified number of samples.

6. The color processing apparatus according to claim 1, wherein the controlling unit detects a specified number of samples input via a host interface (I/F) or a specified setting mode associated with a certain number of samples, and causes the creating unit to create the target CIE color conversion table corresponding to the specified number of samples.

7. The color processing apparatus according to claim 1, wherein the controlling unit detects a memory capacity that is free for processing-use, calculates an appropriate number of samples for the memory capacity that is free, and causes the creating unit to create the target CIE color conversion table corresponding to the number of samples.

8. The color processing apparatus according to claim 1, wherein the controlling unit refers to the number of samples assigned to each type of a drawing object dealt with by the CIE color conversion table, and causes the creating unit to create the target CIE color conversion table corresponding to the number of samples.

9. The color processing apparatus according to claim 1, further comprising:
a compressing unit that compresses data to be stored in the storage unit; and
an expanding unit that expands data to be output from the storage unit.

10. The color processing apparatus according to claim 1, further comprising a deleting unit that deletes a CIE color conversion table already stored in the storage unit if number of the CIE color conversion tables stored in the storage unit exceed a threshold and a new CIE color conversion table is to be stored in storage unit.

11. The color processing apparatus according to claim 10, wherein the deleting unit deletes a CIE color conversion table that is oldest.

12. The color processing apparatus according to claim 10, wherein the deleting unit deletes a CIE color conversion table that is used least.

13. The color processing apparatus according to claim 1, wherein when converting the specified CIE color to a device color value, the converting unit approximates an output value by interpolation using sample values and corresponding output values in the target CIE color conversion table.

14. The color processing apparatus according to claim 13, wherein when performing the interpolation, the converting unit approximates the output values using either an algorithm for tetrahedral interpolation or an algorithm for triangular prism interpolation.

15. A computer program product stored on a non-transitory computer-readable recording medium, wherein instructions of the computer program product, when executed on a computer, cause the computer to execute:
creating at least one CIE color conversion table to be used to convert a CIE color to a device color value and storing the CIE color conversion table in a storing unit;
deciding, when a CIE color is specified, an appropriate CIE color conversion table for specified CIE color;
checking if the appropriate CIE color conversion table is present in the storage unit;
selecting, if the appropriate CIE color conversion table is present in the storage unit, that CIE color conversion table as a target CIE color conversion table;
creating, if the appropriate CIE color conversion table is not present in the storage unit, a CIE color conversion table that is appropriate for the specified CIE color as a target CIE color conversion table, and storing the target CIE color conversion table in the storage unit; and
converting the specified CIE color to a device color value by using the target CIE color conversion table,
further comprising detecting an embedded memory capacity, calculating an appropriate number of samples for the memory capacity, and creating the target CIE color conversion table corresponding to the number of samples.

* * * * *